(12) United States Patent
Potdar et al.

(10) Patent No.: US 7,715,991 B2
(45) Date of Patent: May 11, 2010

(54) SYSTEMS AND METHODS FOR MONITORING ENERGY SYSTEM COMPONENTS

(75) Inventors: Yogesh Kesrinath Potdar, Niskayuna, NY (US); David Ernest Welch, Amsterdam, NY (US); David Wing Chau, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 11/750,025

(22) Filed: May 17, 2007

(65) Prior Publication Data

US 2008/0288183 A1    Nov. 20, 2008

(51) Int. Cl.
*G06F 17/40*    (2006.01)
*G06F 17/00*    (2006.01)

(52) U.S. Cl. .............................. 702/34; 702/35; 702/36; 73/577

(58) Field of Classification Search .................. 702/34, 702/35, 36
See application file for complete search history.

(56) References Cited

U.S. PATENT DOCUMENTS

| | | | |
|---|---|---|---|
| 3,998,093 | A | 12/1976 | Bertolasi |
| 4,933,633 | A | 6/1990 | Allgood |
| 5,050,108 | A | 9/1991 | Clark et al. |
| 5,157,619 | A * | 10/1992 | Palusamy et al. ............. 702/43 |
| 5,210,704 | A * | 5/1993 | Husseiny ..................... 702/34 |
| 5,311,562 | A | 5/1994 | Palusamy et al. |
| 5,553,504 | A * | 9/1996 | Lyons et al. .................. 73/799 |
| 5,648,038 | A | 7/1997 | Fathi et al. |
| 5,970,437 | A | 10/1999 | Gorman et al. |
| 6,006,163 | A * | 12/1999 | Lichtenwalner et al. ....... 702/36 |
| 6,358,004 | B1 | 3/2002 | Shiga et al. |
| 6,405,601 | B1 | 6/2002 | Yang |
| 6,460,012 | B1 * | 10/2002 | Welch et al. ................ 702/182 |
| 6,476,624 | B1 | 11/2002 | Chuman et al. |

(Continued)

FOREIGN PATENT DOCUMENTS

EP    1429219 A1    5/2007

OTHER PUBLICATIONS

Mukhopadhyay, et al., On-line fatigue-creep monitoring system for high-temperature components of power plants, Int'l J. of Fatigue, 23:549-560 (2001).

(Continued)

*Primary Examiner*—Hal D Wachsman
(74) *Attorney, Agent, or Firm*—Armstrong Teasdale LLP

(57) ABSTRACT

A method for estimating an amount of damages sustained by a component operating in an energy system by monitoring the component is provided. The method includes generating a transfer function that is dependent upon an input of at least one operating condition of the component and an output of a crack-initiation time and/or a crack propagation for at least one critical region. The method further includes receiving data from at least one sensor coupled to the component, wherein the data relates to the at least one operating condition of the component, and inputting the received data from the at least one sensor into the transfer function to calculate at least one of the crack-initiation time and the crack propagation for the at least one critical region. The method also includes recording at least one of the crack-initiation time and the crack propagation on a memory storage device.

20 Claims, 3 Drawing Sheets

U.S. PATENT DOCUMENTS

| | | |
|---|---|---|
| 6,532,435 B1 | 3/2003 | Aoshika et al. |
| 6,636,813 B1 * | 10/2003 | Isobe et al. .................... 702/34 |
| 6,801,871 B2 | 10/2004 | Ishii et al. |
| 6,810,748 B1 | 11/2004 | Nishida et al. |
| 6,928,391 B2 * | 8/2005 | Fujiyama et al. ............ 702/185 |
| 7,065,471 B2 * | 6/2006 | Gotoh et al. ................ 702/183 |
| 7,143,007 B2 | 11/2006 | Long et al. |
| 7,162,373 B1 * | 1/2007 | Kadioglu et al. .............. 702/35 |
| 7,243,042 B2 | 7/2007 | Plotts et al. |
| 7,283,919 B2 | 10/2007 | Gross et al. |
| 2004/0117045 A1 | 6/2004 | Hovland et al. |
| 2004/0230541 A1 | 11/2004 | Lefton et al. |
| 2004/0240600 A1 | 12/2004 | Freyer et al. |
| 2005/0224577 A1 | 10/2005 | Rozenblat et al. |
| 2006/0100915 A1 | 5/2006 | Fujuyama et al. |
| 2006/0106577 A1 | 5/2006 | Hatakeyama |
| 2006/0288794 A1 | 12/2006 | Hardwicke et al. |
| 2007/0034009 A1 | 2/2007 | Pado |
| 2007/0214255 A1 | 9/2007 | Spitz et al. |
| 2008/0177516 A1 * | 7/2008 | Vasudevan et al. ............. 703/2 |

OTHER PUBLICATIONS

Kallappa, et al., Life-extending Control of Fossil Fuel Power Plants, Automatica, 33(6):1101-1118 (1997).

Landes, J.D., et al., "A Fracture Mechanics Approach to Creep Crack Growth," Mechanics of Crack Growth, ASTM STP 590, American Society for Testing and Materials, 1976, 22 pages.

* cited by examiner

SYSTEMS AND METHODS FOR MONITORING ENERGY SYSTEM COMPONENTS

BACKGROUND OF THE INVENTION

This invention relates generally to energy systems, and more specifically to systems and methods for monitoring energy system components.

In at least some known energy systems, some components operate under high-stress conditions including high temperatures (e.g., 1050° F.) and pressures. Over time, because of continued exposure to such operating conditions, such components may sustain damage due to creep and fatigue. For example, a steam-turbine casing can sustain fatigue damage as a result of variations in pressure and temperature that occur during system startup, system shutdown, and steady-state operations of the system. However, some components can continue to operate years after a crack has developed within the component. By adjusting the operating conditions, the longevity and durability of the system's components can be extended.

In at least some known energy systems, system operation is periodically suspended so that the system's components may be inspected for damage, i.e., periodic inspections, and/or if necessary, to enable components to be replaced or repaired. However, because known methods do not accurately estimate the time intervals for suspending operations, operational costs associated with shutting down the energy system are increased through premature failures, periodic inspections, and routine outages.

BRIEF DESCRIPTION OF THE INVENTION

In one aspect, some configurations of the present invention provide a method for estimating an amount of damage sustained by a component operating in an energy system. The method includes generating a transfer function that is dependent upon at least one operating condition of the component, receiving data from at least one sensor operatively coupled to the component, the data relating to the at least one operating condition, applying the data to the transfer function of the at least one critical region to calculate at least one of a crack-initiation time and a crack propagation for the at least one critical region, and recording at least one of the crack-initiation time and the crack propagation on a memory storage device.

In another aspect, some configurations of the present invention provide a method of operating an energy system including a component that has at least one critical region which may develop a crack. The method includes developing a transfer function for the at least one critical region during a design stage of the component, the transfer function dependent upon at least one operating condition, receiving data from at least one sensor operatively coupled to the component, the data relating to the at least one operating condition, applying the data to the transfer function of each critical region to calculate at least one of the crack-initiation time and the crack propagation for the critical region, and determining at least one of an operating schedule and an operating parameter for the energy system based on at least one of the crack-initiation time and the crack propagation.

In another aspect, some configurations of the present invention provide a control system for operating an energy system. The control system includes an energy system component comprising a predetermined transfer function dependent upon at least one operating condition, and at least one sensor coupling a critical region of said energy system component to said computing system. The computing system further comprises a processor programmed to receive data from a sensor relating to an operating condition, apply the data to the transfer function of a critical region to calculate at least one of a crack-initiation time and a crack propagation for the critical region, and record at least one of the crack-initiation time and crack propagation for the critical region on a memory storage device.

DETAILED DESCRIPTION OF THE INVENTION

Figure 1:
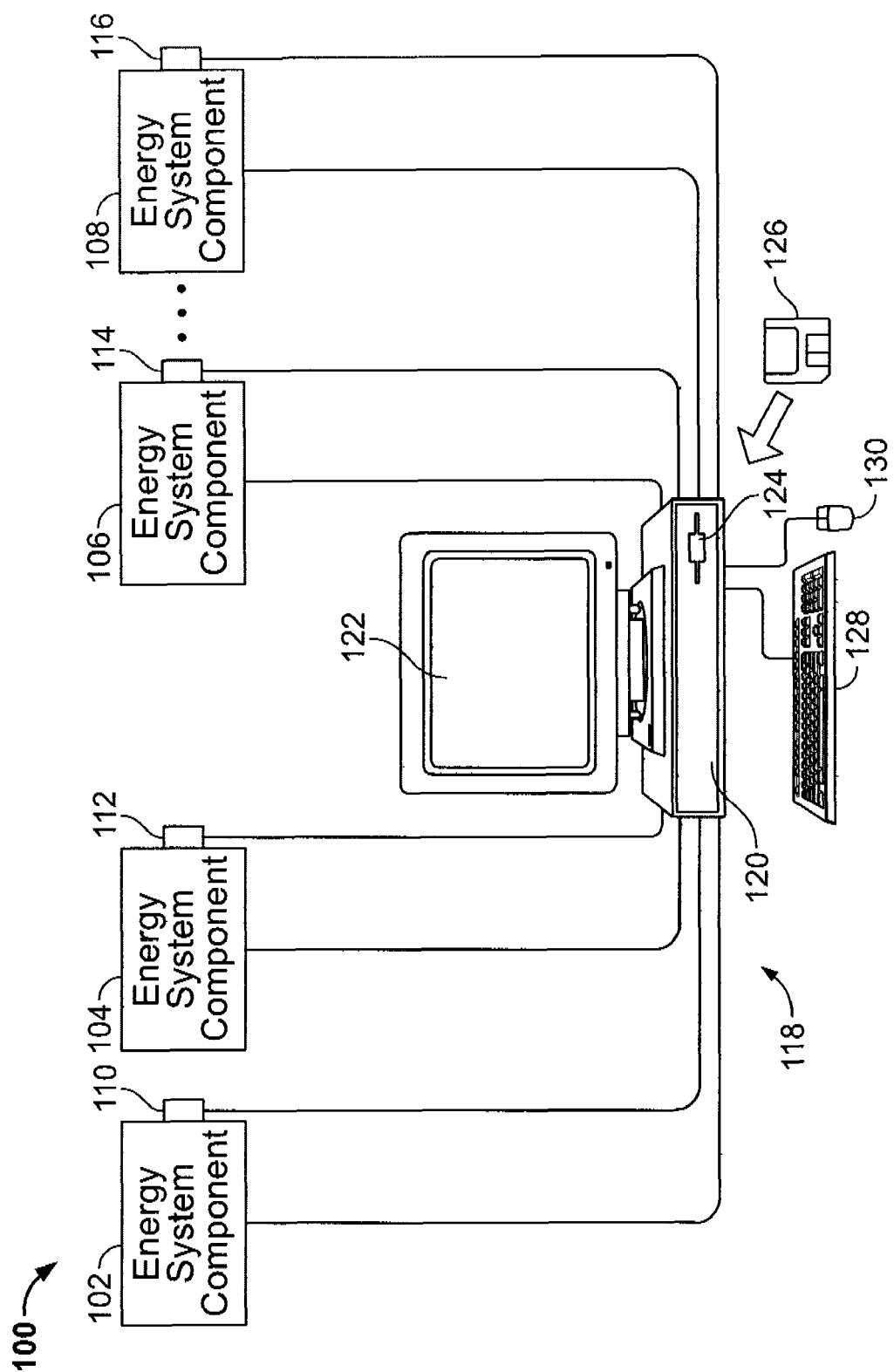
FIG. 1 is a block diagram of an exemplary computer system that may be used to implement an energy component monitoring system.

FIG. 1 is a block diagram of an exemplary energy monitoring system 100. In the exemplary embodiment, energy monitoring system 100 is implemented via a computer system 118 that includes a display 122, a processor 120, a user input device such as a keyboard 128, a pointing device 130 such as a computer mouse (other pointing devices are acceptable as a design choice), and a memory storage device (not all of which is shown in FIG. 1, but which may include primary memory such as, but not limited to, RAM and ROM, and/or storage devices such as flash memory, EEPROM, floppy disks 126 and floppy disk drive 124, CD-ROM, CD-R, CD-RW, magnetic tape, DVD-ROM, DVD-R, DVD-RW, DVD+R, DVD+RW, hard drives, and various types of magnetic, optical, and electronic or electrostatic storage devices and drives without limitation).

Moreover, in the exemplary embodiment, energy monitoring system 100 is operatively coupled to a power plant (e.g., steam turbine) and to one or more sensors 110, 112, 114, and/or 116 that are configured to sense conditions of a corresponding set of one or more operating physical energy system components such as energy system components 102, 104, 106, and/or 108. Energy system components 102, 104, 106, and/or 108 may include, but are not limited to, globe valves, gate valves, and butterfly valves. Further examples of energy system components 102, 104, 106, and/or 108 include, but are not limited to, stationary structures such as a steam turbine casing or any turbomachinery component that may be subject to sustained stresses at high temperatures and may develop cracks due to accumulated creep and fatigue damage. Sensors 110, 112, 114, and/or 116 that measure, for example, temperature may be coupled to energy system components 102, 104, 106, and/or 108 by typical adhesion schemes including, but not limited to, welding. Further, sensors 110, 112, 114, and/or 116 that measure pressure may be coupled to energy system components 102, 104, 106, and/or 108 using methods including, but not limited to, insertion at appropriate locations upstream or downstream of the monitored energy system component 102, 104, 106, and/or 108.

Computer system 118 receives signals transmitted from sensors 110, 112, 114, and/or 116 and processes the signals as described in detail below. In some embodiments, computer system 118 is configured to transmit signals to one or more physical energy system components 102, 104, 106, and/or 108, which may not necessarily be the same components as those being monitored by sensors 110, 112, 114, and/or 116 to facilitate controlling energy monitoring system 100. Alternatively, computer system 118 is not configured to control energy monitoring system 100 and/or to sense conditions of one or more physical energy system components 102, 104, 106, and/or 108. In such embodiments, input and/or control of energy monitoring system 100 can be provided by receiving and/or transmitting signals from, or to, one or more separate software or hardware system(s) that interact with energy system components 102, 104, 106, and/or 108 of the plant and/or sensors 110, 112, 114, and/or 116.

Figure 2:
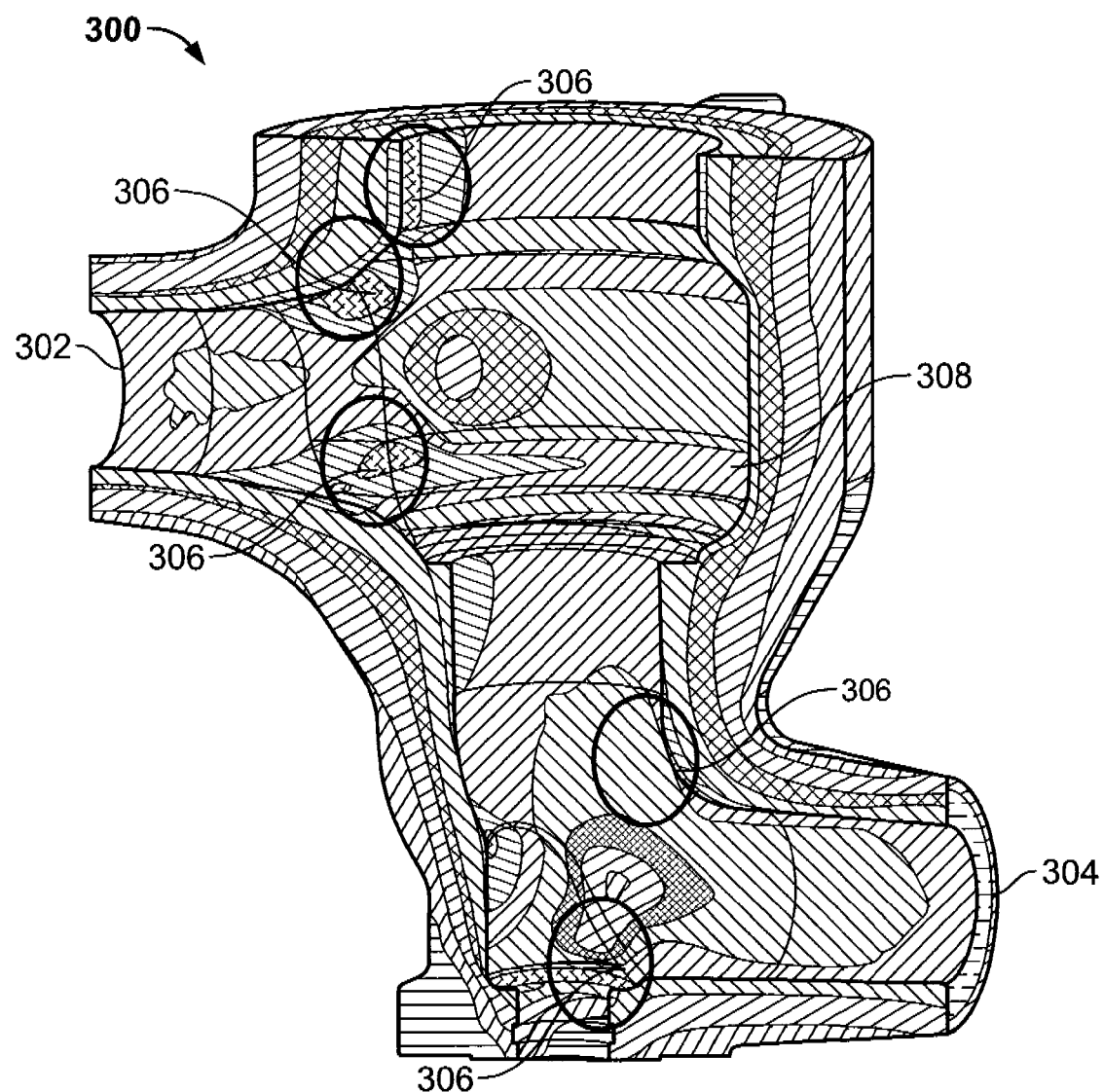
FIG. 2 is an exemplary component that may be used in an energy system.

FIG. 2 illustrates an exemplary component that may be monitored using energy monitoring system 100 (shown in FIG. 1). Specifically, FIG. 2 illustrates a globe valve 300 that may be monitored with energy monitoring system 100. In the exemplary embodiment, globe valve 300 includes a valve body 308 and a valve disposed within (not shown) and is the main pressure containing structure for the valve assembly. Accordingly, in the exemplary embodiment, globe valve 300 includes an inlet port 302 and an outlet port 304. Although globe valve 300 shows a plurality of critical regions 306, those of ordinary skill in the art will recognize that any energy system component that is subjected to a high-stress environment and that includes one or more critical regions may be monitored with energy monitoring system 100.

The term "critical region," as used herein, represents a portion of an energy system component or structure that may develop a crack, and/or that may limit the life of the component or structure as a result of creep, and/or fatigue damage, and/or crack propagation due to creep and/or fatigue. The critical region of a component may be determined from the operation history of that component, and/or similar components, and/or through testing to determine which region or portion is a critical region.

During operation, globe valve 300 is exposed to fluctuations of temperature and pressure, as well as cyclic-loading due to such fluctuations. Globe valve 300 may also fluctuate as a result of other factors, including, but not limited to, piping deadweight, and/or thermal expansion. Thus, over time globe valve 300 may develop cracks in one or more critical regions 306. Crack-initiation and crack propagation can be affected by many factors such as, but not limited to, process parameters, grain size, hold time, temperature, and/or pressure. In addition, hold time duration, and/or the operating environment (steam or air) can also affect the crack growth rate.

Figure 3:
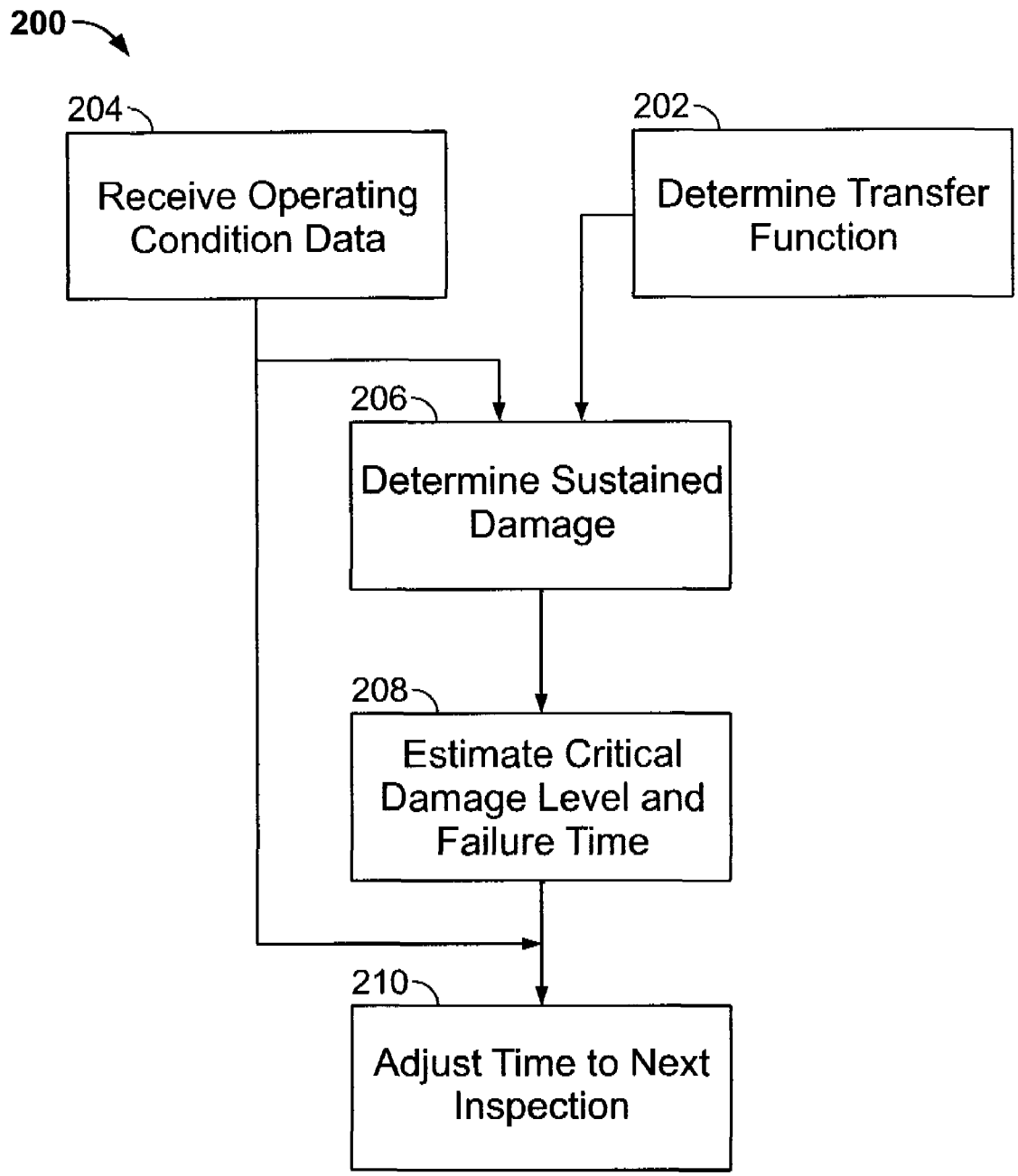
FIG. 3 is a flow chart illustrating an exemplary method used to monitor energy system components.

As a result, FIG. 3 is a flow chart of an exemplary method 200 that may be used to estimate the timing and/or amount of creep or fatigue damage to an energy system component, such as globe valve 300 shown in FIG. 2, operating in an energy system. Method 200 may also be used to monitor existing damage to the energy system component in order to predict a future failure date.

In the exemplary embodiment, initially at least one transfer function is determined 202 for at least one critical region 306 of the energy system component being monitored. The term "transfer function," as used herein, is a function that is applied to operating data (e.g., relating to temperature, pressure) to determine component stresses. Transfer functions are dependent upon a number of factors, including, but not limited to, material properties of the component, operating conditions, and the dimensions of the component near the critical region. Transfer functions may be determined using standard closed-formed solutions and/or elastic and creep finite element analyses. In the exemplary embodiment, a transfer function is developed at the design stage between measured temperature gradients (spatial and temporal), pressure, and combined damage due to low cycle fatigue (LCF) and creep, and subsequent crack propagation due to creep and fatigue.

The term "failure," as applied to engineering systems or components, can be described as the non-performance of components or systems due to some deficiency that limits their service life. Failures are not uncommon in industry and can occur at any of the various stages such as fabrication, testing, transportation and service.

In the exemplary embodiment, data relevant to one or more operating conditions is recorded 204 in pre-determined intervals ranging from about thirty to about sixty seconds. Alternatively, data may be recorded in different time intervals, based on the energy system component being monitored. The operating conditions recorded may include, but are not limited to, temperature, pressure, and/or cyclic loading due to fluctuations in either temperature, pressure, or both. Those skilled in the art will recognize that other conditions that affect crack-initiation time and propagation may be recorded or monitored.

In the exemplary embodiment, energy monitoring system 100 calculates creep and fatigue damage 206, as described in more detail below, using the predetermined transfer function 202 and the data relevant to one or more operating conditions 204. Moreover, based on the calculations, energy monitoring system 100 can accurately estimate crack initiation and propagation in the energy system component being monitored. Specifically, in the exemplary embodiment, cumulative creep and fatigue damage is used to calculate the total amount of consumed life, in terms of crack initiation, of the globe valve 300. Then, crack propagation data is used to estimate 208 an approximate time when crack size in the globe valve 300 will reach a predetermined critical size. At that time, operation of the energy system must be suitably adjusted until the cracked region is repaired or the energy system component is replaced by suspending operation.

To account for combined damage mechanism, the damage accumulation approach considers the damage due to creep and fatigue separately using:

$$\sum_{i}^{P} \frac{n_i}{N_i} + \sum_{j}^{Q} \frac{t_j}{t_{jm}} \le D \quad \text{Eq. (1)}$$

where D is the total allowable creep-fatigue damage index which guides component inspection or replacement intervals, $n_i$ is the number of cycles at stress $\sigma_i$, $N_i$ is the number of cycles to failure at the same stress $\sigma_i$, P is the number of different cyclic loading conditions, $t_j$ is the total duration of a specific loading at elevated temperature j during the entire service life of the component, $t_{jm}$ is the maximum allowed time under load stress intensity, and Q is the number of different specific loading conditions. This damage parameter formulation demonstrates a linear damage rule, and based on experience for particular applications, materials, and geometries, other damage rules can be used including, but not limited to, a damage rule that assigns different weights to creep and fatigue damage.

Such a determinative number is particularly important for utilities that have inspected energy system components and have found cracks, but must continue to run the unit while waiting for a replacement part or an extended outage. This crack growth is attributed to the combined effect of fatigue crack growth and creep crack growth. The accumulated effect is determined by computing the effects separately and then by adding them together. The fatigue crack growth rate is calculated as follows:

$$\frac{da}{dN} = C(\Delta K_{eff})^m \qquad \text{Eq. (2)}$$

where $\Delta K_{eff}$ is the effective stress intensity factor (SIF) range and where both C and m are material constants. The propagation of the defect ($\delta a_i$) for the number of occurrences of cycles $n_i$, is:

$$(\delta a_i)_{fat} = \sum_i^{n_{ij}} C(\Delta K_{eff})_i^m \qquad \text{Eq. (3)}$$

where $(\Delta K_{eff})_i$ is the maximum effective SIF range corrected for the influence of plasticity.

Creep crack growth rates are calculated using the time-dependent $C_t$ approach or according to the guidelines of. The propagation of the defect due to creep during hold time $t_{mi}$ is:

$$(\partial a i)_{crp} = \int_0^{t_{mi}} A(C_i^*)^q \, dt \qquad \text{Eq. (4)}$$

where C* is the creep fracture parameter. In the exemplary embodiment, the creep fracture parameter of the following nature can be used:

$$C^* = \int_\Gamma W^* dy - T_i \left( \frac{\partial u_i}{\partial x} \right) ds \qquad \text{Eq. (5)}$$

where $$W^* = \int_0^{\varepsilon mn} \sigma_{ij} d\varepsilon_{ij} \qquad \text{Eq. (6)}$$

$\Gamma$ is the line contour taken from the lower crack surface in a counterclockwise direction to the upper crack surface. W* is the strain energy rate density associated with the point stress $\sigma_{ij}$ and strain rate $\varepsilon_{ij}$. $T_i$ is the traction vector defined by the outward normal $\Gamma$, $Ti = \sigma_{ij} n_j u_i$ is the displacement vector and S is the arc length along $\Gamma$.

The combination of the determined total consumed life of the energy system component, design limits of the energy system component, the recommended operating procedures, and the rated allowable temperature excursions enables the scheduled timing of the next planned inspection to be adjusted and/or optimized 210. For example, if energy monitoring system 100 determines that the energy system component being monitored has been subjected to less severe temperature gradients, pressures, and/or fluctuations, then the timing of the next inspection may be extended, subject to continuous monitoring of the energy system component and normal system operations.

Conversely, if energy monitoring system 100 determines that the energy system component being monitored has been exposed to more severe temperature gradients, pressures, and/or fluctuations than recommended, but is still operating within design limits, then the system operator can be notified of a possible need to inspect the energy system component sooner than originally planned. Additionally, if a first inspection does not detect a crack in the energy system component, then the time until the next inspection may be extended to account for crack initiation and propagation using the predetermined transfer function. Thus, the system is dynamic in nature and evolves with actual system operation and findings.

The above-described methods and apparatus facilitate improving the scheduling of inspection intervals of an energy system component in a power system. Developing a transfer function at the design stage, between measured temperatures, pressures, and cumulative fatigue and creep damage allows calculation of crack initiation and life consumption of the energy system component. This calculation, when used in combination of design limits of the energy system component and recommended operating procedures of the power plant, facilitates calculating the next planned inspection. As such, if the power system operates such that the monitored energy system component is subjected to less severe operating conditions, then the timing of the next inspection of the energy system component may be extended. If, however, the monitored energy system component is subjected to more severe operating conditions, the next inspection may be scheduled sooner than originally planned. Since inspection intervals may be based on actual power system operation, the utilization of the power system and its energy system components may be optimized to allow for continued system operation during expected peak power periods.

Exemplary embodiments of methods and apparatus for monitoring energy system components are described above in detail. The methods and apparatus are not limited to the specific embodiments described herein, but rather, components of the methods and apparatus may be utilized independently and separately from other components described herein. For example, the interaction of creep and fatigue in the design stage of a system component may also be used in combination with other industrial component design and monitoring systems and methods, and is not limited to practice with only energy system plants as described herein. Rather, the present invention can be implemented and utilized in connection with many other component design and monitoring applications.

While the invention has been described in terms of various specific embodiments, those skilled in the art will recognize that the invention can be practiced with modification within the spirit and scope of the claims.

What is claimed is:

1. A method for estimating an amount of damage sustained by a component operating in an energy system by monitoring the component, the method comprising:
    generating a transfer function that is dependent upon an input of at least one operating condition of the component and an output of at least one of a crack-initiation time and a crack propagation for at least one critical region;
    receiving data from at least one sensor coupled to the component, wherein the data relates to the at least one operating condition of the component;
    inputting the received data from the at least one sensor into the transfer function to calculate the at least one of the crack-initiation time and the crack propagation for the at least one critical region; and
    recording at least one of the crack-initiation time and the crack propagation on a memory storage device.

2. A method in accordance with claim 1 wherein monitoring a component further comprises monitoring a globe valve that includes a plurality of critical regions.

3. A method in accordance with claim 1 further comprising estimating the remaining time until the critical damage level or failure occurs for the component being monitored.

4. A method in accordance with claim 1 wherein generating a transfer function further comprises developing the transfer function based on at least one of measured temperature gradients and low-cycle-fatigue (LCF) life consumed.

5. A method in accordance with claim 1 further comprising:
   inspecting the component to obtain information indicative of an amount of damage to the component; and
   applying the information indicative of the amount of damage to the component to the transfer function to enable at least one of the crack-initiation time and the crack propagation to be re-calculated.

6. A method in accordance with claim 1 wherein receiving data from at least one sensor comprises receiving data from a plurality of sensors coupled to the component.

7. A method of operating an energy system including a component that has at least one critical region which may develop a crack therein, said method comprising:
   developing a transfer function for the at least one critical region, wherein the transfer function is based upon an input of at least one operating condition and an output of at least one of a crack-initiation time and a crack propagation for the at least one critical region;
   receiving data from at least one sensor coupled to the component, wherein the data relates to the at least one operating condition;
   applying the data received from the at least one sensor to the transfer function of the at least one critical region to calculate the at least one of the crack-initiation time and the crack propagation for the at least one critical region; and
   determining at least one of an operating schedule and an operating parameter for the energy system based on at least one of the crack-initiation time and the crack propagation.

8. A method in accordance with claim 7 further comprising monitoring the operation of at least one globe valve which includes a plurality of critical regions.

9. A method in accordance with claim 7 wherein developing a transfer function for the at least one critical region further comprises developing the transfer function between measured temperature gradients and low-cycle-fatigue (LCF) life consumed.

10. A method in accordance with claim 7 further comprising adjusting the operating schedule based on the calculation of at least one of the crack-initiation time and the crack propagation for the at least one critical region.

11. A method in accordance with claim 10 wherein adjusting the operating schedule comprises using the data received from the at least one sensor relating to a change in the at least one operating condition and a life expectancy adjustment to calculate an inspection time adjustment.

12. A method in accordance with claim 10 wherein adjusting the operating schedule comprises increasing the time until the next inspection based on a previous inspection resulting in no observable cracks.

13. A method in accordance with claim 7 further comprising:
   inspecting the component to obtain information relating to an amount of damage of the component; and
   applying the information to the transfer function to re-calculate at least one of the crack-initiation time and the crack propagation.

14. A method in accordance with claim 7 wherein receiving data from at least one sensor comprises receiving data from a plurality of sensors that are each coupled to the component.

15. A control system for use in monitoring and operating an energy system, said control system comprising:
   a component comprising a predetermined transfer function based on an input of at least one operating condition of the energy system and an output of at least one of a crack-initiation time and a crack propagation within at least one critical region;
   at least one sensor coupled to said component for monitoring the at least one operating condition of said component; and
   a processor configured to:
      receive data from said at least one sensor, wherein the data relates to at least one operating condition of said component;
      apply the data to the transfer function to calculate at least one of the crack-initiation time and the crack propagation within the at least one critical region; and
      record at least one of the crack-initiation time and the crack propagation of the at least one critical region on a memory storage device.

16. A control system in accordance with claim 15, wherein said component further comprises at least one critical region.

17. A control system in accordance with claim 15, said system configured to:
   determine a first life expectancy using the transfer function and data regarding at least one operating condition;
   receive data relating to a change in the at least one operating condition for the at least one critical region of the component; and
   calculate a life expectancy adjustment using the transfer function and data relating to the change in the at least one operating condition.

18. A control system in accordance with claim 15, said processor further configured to determine a first life expectancy using the transfer function and the data received from at least one sensor relating to at least one operating condition.

19. A control system in accordance with claim 15, said processor further configured to receive data relating to a change in the at least one operating condition for the at least one critical region of the component.

20. A control system in accordance with claim 15, said processor further configured to calculate a life expectancy adjustment using the transfer function and the data relating to a change in that at least one operating condition.

* * * * *